United States Patent [19]
Scaramucci

[11] 3,779,512
[45] Dec. 18, 1973

[54] STAMPED-DISC BUTTERFLY VALVE

[76] Inventor: Domer Scaramucci, 3245 S. Hattie, Oklahoma City, Okla. 73129

[22] Filed: Aug. 18, 1971

[21] Appl. No.: 172,628

[52] U.S. Cl................................. 251/308, 251/306
[51] Int. Cl............................................. F16k 1/22
[58] Field of Search................... 251/305, 306, 308, 251/173

[56] References Cited
UNITED STATES PATENTS

| | | | |
|---|---|---|---|
| 3,290,001 | 12/1966 | Taylor | 251/306 X |
| 3,111,300 | 11/1963 | Boone | 251/306 |
| 3,565,395 | 2/1971 | Hansen | 251/306 |
| 3,329,398 | 6/1967 | Goldsmith | 251/306 |
| 3,656,714 | 4/1972 | Peterson | 251/306 |
| 3,341,170 | 9/1967 | Housworth | 251/306 |
| 3,540,691 | 11/1970 | Snell | 251/306 |
| 3,473,784 | 10/1969 | Radford | 251/306 |
| 3,568,975 | 3/1971 | Obermaier | 251/306 |

FOREIGN PATENTS OR APPLICATIONS

| | | | |
|---|---|---|---|
| 1,008,139 | 5/1952 | France | 251/305 |
| 1,070,630 | 3/1959 | France | 251/306 |

*Primary Examiner*—Alan Cohan
*Assistant Examiner*—Gerald A. Michalsky
*Attorney*—Dunlap, Laney, Hessin & Dougherty

[57] ABSTRACT

A butterfly valve assembly including a generally cylindrical liner carried within a valve body which valve body has a bore extending therethrough and is adapted to be supported between a pair of aligned pipe flanges. A cylindrical valve stem extends through the bores of the valve body and the liner and is journaled at each end thereof in the valve body. A one-piece butterfly valve disc is sized and shaped to conform to the valve stem and is rigidly secured thereto for opening and closing the valve assembly. An elastomer is molded-in-place and bonded around the entire inner periphery of the liner. An annular valve seat is formed on the inner periphery of the liner to provide, in conjunction with the elastomer, a seal between the liner and the butterfly valve disc when the butterfly valve disc is in the closed position.

5 Claims, 4 Drawing Figures

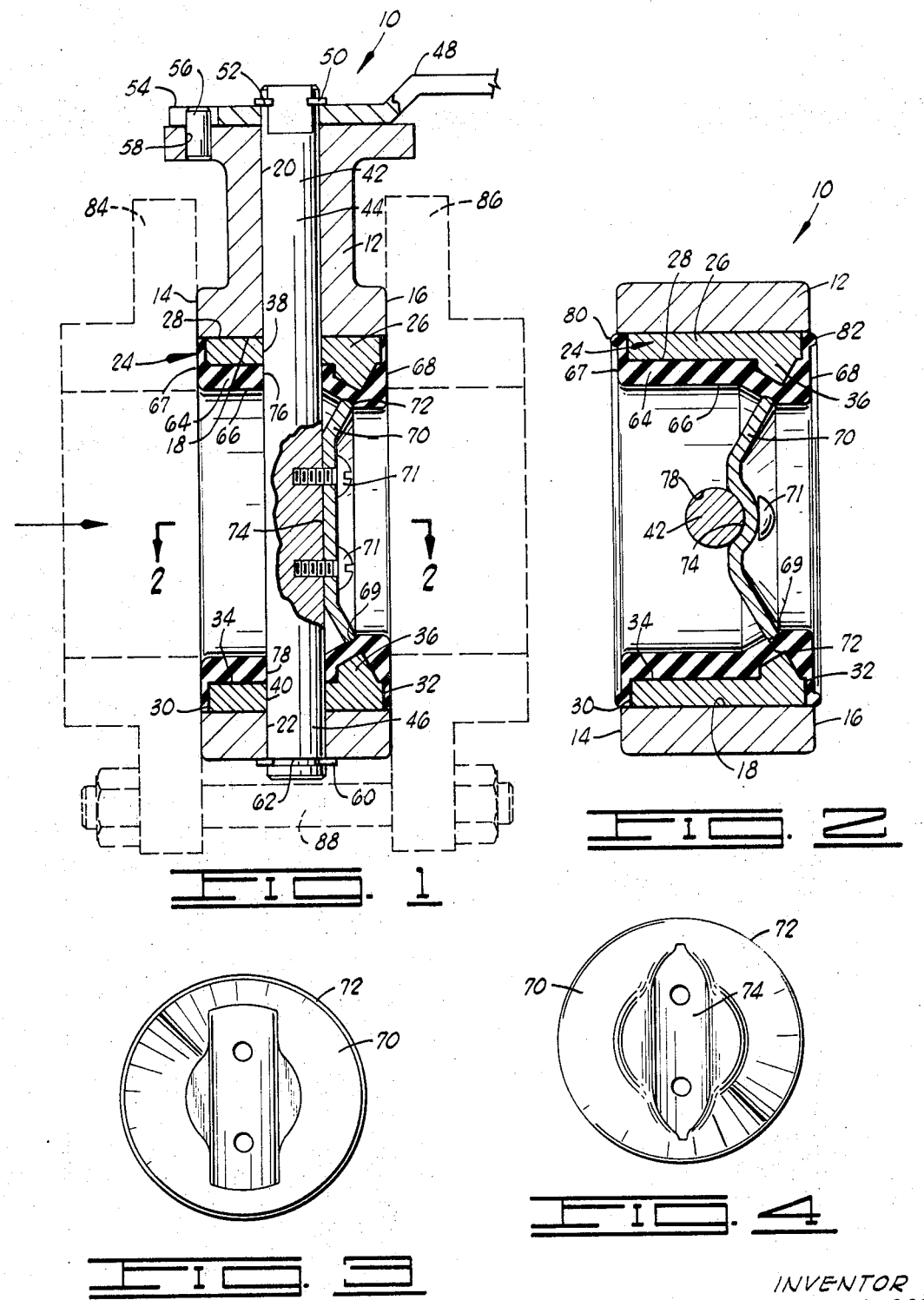

STAMPED-DISC BUTTERFLY VALVE

BACKGROUND OF THE INVENTION

1. Field of the Invention

This invention relates to improvements in butterfly valves and more particularly, but not by way of limitation, to improvements in construction of butterfly valve discs for use in butterfly valves.

2. Description of the Prior Art

The prior art contains many illustrations of butterfly valves having butterfly valve discs constructed from stampings. However, such valve discs are generally limited to very low pressure service since they tend to bend and deflect downstream on each side of the valve stem thereby causing leakage at the seal. In order to provide additional strength to the prior art butterfly valve discs, laminated construction using multiple stampings has been used in some butterfly valve designs.

Other butterfly valve designs illustrate the attachment of the butterfly valve disc to a flat surface formed on the valve stem to obtain rigidity at the point of connection of the butterfly valve disc to the valve stem. Such valve construction is expensive due to the cost involved in machining the flat surface on each valve stem.

A common method of manufacturing butterfly valve discs for higher pressure service is to cast or forge the butterfly valve disc thus forming a solid structure. In some cases the butterfly valve disc and a portion of the valve stem are cast or forged in one piece. In either case, expensive machining costs are incurred in forming the seating surface on the butterfly valve disc and, in the case of the integral disc and stem arrangement, additional machining steps are required to form the ends of the valve stem portions to be journaled in the valve body.

SUMMARY OF THE INVENTION

The present invention contemplates a valve assembly for controlling the flow of fluid between a pair of aligned pipe flanges interconnected by a plurality of circumferentially spaced bolts and comprising a valve body having an upstream end, a downstream end, and a bore extending therethrough and intersecting the upstream and downstream ends. The valve body is adapted to be supported between the aligned pipe flanges by the circumferentially spaced bolts.

A cylindrically valve stem extends through the bore of the valve body and has an upper end portion and a lower end portion, the upper and lower end portions being journaled, respectively, in the valve body. A one-piece butterfly valve member is disposed in the bore of the valve body and is rigidly connected to the cylindrical valve stem for opening and closing the valve assembly. The surface of the butterfly valve member adjacent to the valve stem is shaped to conform to a portion of the cylindrical surface of said valve stem adjacent to the point of rigid connection of the valve member to the valve stem. Seal means are carried in the bore of the valve body for sealingly engaging the butterfly valve member when the butterfly valve member is in the closed position.

An object of the present invention is to provide an improved butterfly valve providing a very strong and rigid butterfly valve member or disc.

Another object of the present invention is to provide an improved butterfly valve wherein the butterfly valve disc is formed to provide a mating surface conforming to the cylindrical surface of the valve stem to provide a simple and rigid connection between the butterfly valve disc and the valve stem.

A further object of th present invention is to provide an improved butterfly valve wherein the connection between the butterfly valve disc and the valve stem is sufficiently rigid to handle the torisonal stress of opening and closing the valve in the higher pressure ranges.

One other object of the present invention is to provide an improved butterfly valve which can be quickly, easily and economically manufactured.

Other objects and advantages of the present invention will be evident from the following detailed description when read in conjunction with the accompanying drawings.

BRIEF DESCRIPTION OF THE DRAWINGS

FIG. 1 is a vertical cross-sectional view of a butterfly valve constructed in accordance with the present invention, and illustrating the butterfly valve assembled between a pair of aligned flanges.

FIG. 2 is a cross-sectional view of the butterfly valve of the present invention taken along line 2—2 of FIG. 1, and illustrating the butterfly valve with the flanges removed.

FIG. 3 is an elevational view of the butterfly valve disc of the present invention as viewed from the side away from the valve stem.

FIG. 4 is an elevational view of the butterfly valve disc of the present invention as viewed from the side adjacent to the valve stem.

DESCRIPTION OF THE PREFERRED EMBODIMENT

Referring now to the drawing, and to FIGS. 1 and 2 in particular, reference character 10 generally designates a butterfly valve constructed in accordance with the present invention. The valve 10 includes a valve body 12 having an upstream end face 14 and a downstream end face 16 formed on the opposite ends thereof. A bore 18 extends through the valve body 12 and intersects the upstream and downstream end faces 14 and 16. A pair of diametrically opposed and axially aligned apertures 20 and 22 are formed in the medial portion of the valve body 12.

A valve seal assembly 24 is slidably disposed within the bore 18 of the valve body 12. The valve seal assembly 24 includes a generally cylindrically shaped liner 26 having a cylindrically shaped outer periphery 28 sized to fit closely within the bore 18 of the valve body 12. The liner 26 has an upstream end face 30 and a downstream end face 32 formed on the opposite ends thereof. A bore 34 extends through the liner 26 and intersects the upstream and downstream end faces 30 and 32. An annular valve seat 36 is formed on the wall of the bore 34 proximate to the downstream end face 32 and extends radially inward therefrom.

It should be noted that the axial distance between the end faces 30 and 32 of the liner 26 is less than the axial distance between the end faces 14 and 16 of the valve body 12.

A pair of diametrically opposed and axially aligned apertures 38 and 40 are formed in the medial portion of the liner 26. The apertures 38 and 40 of the liner 26 are axially aligned with the apertures 20 and 22 of the valve body 12.

A valve stem 42 extends through the valve body 12 and the liner 26 with the upper end portion 44 journaled in the apertures 20 and 38 of the valve body 12 and the liner 26, respectively, and with the lower end portion 46 thereof journaled in the apertures 22 and 40 of the valve body 12 and the liner 26, respectively. A valve operating handle 48 is non-rotatably secured to the upper end portion 44 of the valve stem 42 and is retained in such position by means of a spring clip 50 disposed in an interrupted annular groove 52 formed in the valve stem 42. The handle 48 includes a flange portion 54 which is engageable with a pair of stop pins 56 (only one is shown) to limit the rotational movement of the handle 48 to approximately 90 degrees. The stop pins 56 are disposed in a pair of holes 58 (only one is shown) in the valve body 12. As may be seen, the spring clip 50 limits the downward movement of the valve stem 42.

A second spring clip 60 is disposed in an annular groove 62 formed in the lower end portion 46 of the valve stem 42 and serves to limit the upward movement of the valve stem 42 in the valve 10.

An elastomer 64, having an inner periphery 66 and opposite ends 67 and 68, is bonded to the walls of the bore 34, the annular valve seat 36, and the upstream and downstream end faces 30 and 32 of the liner 26. The portion of the elastomer 64 bonded to the inner periphery of the annular valve seat 36 forms a resilient annular valve seal 69 for purposes which will be described more fully hereinafter.

A butterfly valve member or disc 70 is rigidly secured to the cylindrically shaped surface of the valve stem 42 within the liner 26 by means of a pair of suitable screws 71. The disc 70 is preferably in the form of a stamped metal plate having its outer edge or periphery 72 rounded slightly. The disc 70 is slightly dished with the central portion 74 being sized and shaped to matingly engage the cylindrically shaped outer periphery of the valve stem 42, as best shown in FIG. 2. The disc 70 may be formed to extend as much as one half the circumferential distance around the outer periphery of the valve stem 42 in mating engagement therewith. The attachment of the disc 70 to the valve stem 42 as described above provides what is known in the art as an "offset" disc.

When the butterfly valve disc 70 of the valve 10 is in the closed valve position as shown in FIGS. 1 and 2, the outer periphery 72 of the disc 70 is in sealing engagement with the resilient annular valve seal 69. The portions 76 and 78 of the elastomer 64 adjacent the apertures 38 and 40 of the liner 26, respectively, each encircle the valve stem 42 and have an inner diameter slightly less than the diameter of the valve stem 42. Therefore, the elastomer 64 forms an interference type seal around the stem 42 adjacent each of the apertures 38 and 40.

Annular beads 80 and 82 are formed on the opposite ends 67 and 68, respectively, of the elastomer 64. The annular beads 80 and 82 extend axially beyond the end faces 14 and 16, respectively, of the valve body 12 and sealingly engage two aligned flanges 84 and 86, respectively, as shown in FIG. 1. The flanges 84 and 86 are retained in sealing engagement with the annular beads 80 and 82 by means of circumferentially spaced bolts 88 extending through and interconnecting the flanges 84 and 86.

It should be noted that the liner 26 may be readily replaced in the event of dissipation of the elastomer 64, without replacing the entire butterfly valve 10. It should also be noted that the elastomer 64 is preferably a suitable rubber composition and is preferably molded in place in the liner for economy of manufacture and to enhance the bonding of the elastomer to the liner.

It will also be observed that the axial distance between the annular grooves 52 and 62 formed in the valve stem 42 is of such magnitude as to permit a limited amount of axial movement of the valve stem 42, relative to the liner 26 and the valve body 12, thereby allowing the butterfly valve disc 70 to properly align itself with the resilient annular valve seal 69 to provide optimum valve sealing.

OPERATION OF THE PREFERRED EMBODIMENT

To install the butterfly valve 10, the valve 10 is positioned between a pair of aligned flanges 84 and 86 which are drawn into sealing engagement with the annular beads 80 and 82 by means of the circumferentially spaced bolts 88. When properly assembled, as illustrated in FIG. 1, the flanges 84 and 86 engage the upstream and downstream end faces 14 and 16, respectively, of the valve body 12 while simultaneously deforming the annular beads 80 and 82, thereby providing a fluid tight seal at the valve 10. Since the elastomer 64 completely covers the entire inner periphery of the liner 26 between the flanges 84 and 86, the fluid being controlled by the valve 10 has no opportunity to contact the liner 26 or the valve body 12. Therefore, the liner 26 and the valve body 12 may be made of the most economical material available which will provide the necessary strength, even when highly corrosive fluids are being handled by the valve 10. The elastomer 64 may be selected from a number of suitable materials which will withstand the corrosive action of the fluid being handled. It will then only be necessary to select the appropriate material for the butterfly valve disc 70, the stem 42 and the screws 71 which will withstand the corrosive action of the fluid being handled.

When the butterfly valve disc 70 is positioned in a plane transverse to the longitudinal axis of the liner 26, the outer periphery 72 of the disc 70 sealingly engages the resilient annular valve seal 69 and provides an effective closure of the valve against flow of fluid in either direction.

Molding of the elastomer 64 in the liner 26 facilitates the positioning and sizing of the resilient annular valve seal 69 for accurate engagement thereof by the butterfly valve disc 70. In addition, however, the disc 70 is allowed a small adjustment in a plane parallel to the axis of the valve stem 42 by virtue of the allowable axial movement of the valve stem 42 as previously described, such that the uniform seating of the outer periphery 72 on the resilient annular valve seal 69 is facilitated and the disc 70 and valve seal 69 will provide what is known in the art as full circle seating.

From the foregoing detailed description it can be readily seen that the present invention provides an improved butterfly valve providing a very strong and rigid butterfly valve disc which disc is formed to provide a mating surface conforming to the cylindrical surface of the valve stem to facilitate the rigid connection between the butterfly valve disc and the valve stem. The rigid connection between the butterfly valve disc and the valve stem is sufficiently rigid to handle the torsional stress of opening and closing the valve in the higher pressure ranges. It may further be readily observed that the butterfly valve of the present invention may be quickly, easily and economically manufactured.

Changes may be made in the construction and arrangement of parts or elements of the butterfly valve as described herein without departing from the spirit and scope of the present invention.

What is claimed is:

1. A valve for controlling the flow of fluid between a pair of aligned pipe flanges interconnected by a plurality of circumferentially spaced bolts comprising:

a valve body having an upstream end, a downstream end, and a bore extending therethrough and intersecting the upstream and downstream ends;

cylindrical valve stem means having an upper end portion and a lower end portion and extending through the bore of the valve body, the upper and lower end portions being journaled, respectively, in the valve body for rotating relative to said valve body;

a one-piece butterfly valve member in the bore of the valve body adjacent to the valve stem means in the form of a relatively rigid sheet material having all but the central portion thereof stamped in one direction into a dish-shape and having the central portion thereof stamped in the opposite direction to conform to the portion of the cylindrical surface of said valve stem means adjacent thereto, the outer periphery of said valve member being in a plane;

securing means for rigidly securing the central portion of said butterfly valve member to said valve stem means whereby said butterfly valve member is enabled to rotate with said valve stem means to alternately open and close said valve; and seal means carried in the bore of said valve body for sealingly engaging said butterfly valve member when said butterfly valve member is in the position closing the valve.

2. The valve as defined in claim 1 wherein said one-piece butterfly valve member is characterized further to include:

circumferential seating surface means formed thereon, said circumferential seating surface means lying in a plane offset a distance from the center line of said valve stem for sealingly engaging said seal means when said butterfly valve member is in the position closing said valve.

3. The valve as defined in claim 2 wherein said seal means is characterized further to include:

a generally cylindrically shaped liner having opposite ends and slidably disposed within the bore through said valve body; and an annular valve seat formed on the inner periphery of said liner and extending radially inward therefrom.

4. The valve as defined in claim 3 characterized further to include:

an elastomer molded-in-place around the entire inner periphery of said liner and bonded thereto, a portion of said elastomer forming a resilient annular seal on said annular valve seat, said elastomer encircling and engaging the upper and lower end portions, respectively, of said valve stem.

5. The valve as defined in claim 4 characterized further to include:

a first annular seal bead formed on one end of said elastomer adjacent to and extending beyond one end of said liner to sealingly engage one of said aligned pipe flanges; and a second annular seal bead formed on the opposite end of said elastomer adjacent to and extending beyond the opposite end of said liner to sealingly engage the other of said pair of aligned pipe flanges.

* * * * *